(12) United States Patent
Tornare

(10) Patent No.: US 6,315,418 B1  
(45) Date of Patent: Nov. 13, 2001

(54) METHOD AND DEVICE FOR HEATING A MOTOR VEHICLE DRIVING MIRROR

(75) Inventor: Jean-Marc Tornare, Toulouse (FR)

(73) Assignee: Siemens Automotive S.A., Toulouse (FR)

( * ) Notice: Subject to any disclaimer, the term of this patent is extended or adjusted under 35 U.S.C. 154(b) by 0 days.

(21) Appl. No.: 09/623,193

(22) PCT Filed: Feb. 17, 1999

(86) PCT No.: PCT/EP99/01034

§ 371 Date: Jan. 29, 2001

§ 102(e) Date: Jan. 29, 2001

(87) PCT Pub. No.: WO99/43515

PCT Pub. Date: Sep. 2, 1999

(30) Foreign Application Priority Data

Feb. 27, 1998 (FR) .................................................. 98 02408

(51) Int. Cl.$^7$ ................................. G02B 11/04; B60J 1/08
(52) U.S. Cl. ......................................... 359/512; 296/146.1
(58) Field of Search ..................................... 359/507, 512, 359/877; 296/146.1

(56) References Cited

U.S. PATENT DOCUMENTS

| | | | |
|---|---|---|---|
| 4,882,842 | * 11/1989 | Basson et al. | 29/857 |
| 4,967,114 | 10/1990 | Komurasakai et al. | 310/329 |
| 5,125,263 | 6/1992 | Komurasaki et al. | 73/35 |
| 5,412,166 | * 5/1995 | Krupp et al. | 200/6 |
| 5,744,698 | 4/1998 | Genot | 73/35.11 |

* cited by examiner

*Primary Examiner*—Cassandra Spyrou  
*Assistant Examiner*—Jared Treas  
(74) *Attorney, Agent, or Firm*—Herbert L. Lerner; Laurence A. Greenberg; Werner H. Stemer

(57) ABSTRACT

The present invention relates to a method of commanding the heating of a motor vehicle rear-view mirror, said vehicle being, in particular, equipped with an electrical device for commanding the movement of the windows, said method being characterized in that the device for commanding the lifting and lowering of one and the same window is used as a command to heat the rear-view mirror.

The present invention also relates to a corresponding rear-view mirror heating device.

6 Claims, 1 Drawing Sheet

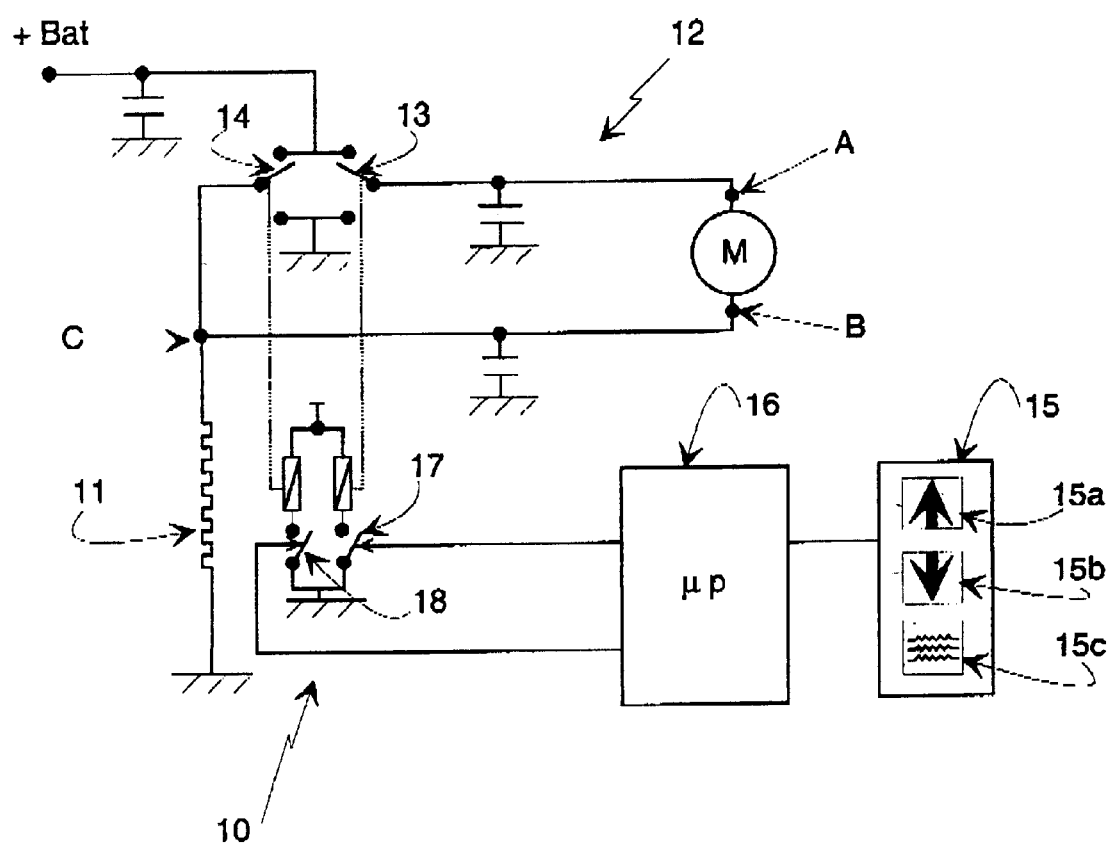

METHOD AND DEVICE FOR HEATING A MOTOR VEHICLE DRIVING MIRROR

BACKGROUND OF THE INVENTION

Field of the Invention

The present invention relates to a method and a device for commanding the heating of a motor vehicle exterior rear-view mirror.

It is an already known practice for a resistive element to be placed inside a motor vehicle window and for this window to be de-iced by passing a current through this resistive element. This technique is commonly employed for de-icing the rear window of a vehicle.

Certain vehicles are also equipped with means for de-icing the exterior rear-view mirrors, operating on the same principle.

Thus, in the most highly sophisticated vehicles, there are now, in each door, a device for commanding the de-icing of the rear-view mirrors, an electronic device for commanding the remote opening of the doors, an electrical device for commanding the movement of the windows, etc. Of course, the proliferation of such devices makes the electronic modules that need to be incorporated into the doors more complicated to produce, and increases their cost.

SUMMARY OF THE INVENTION

The object of the present invention is to command the de-icing of the rear-view mirrors without increasing the number of electronic modules fitted in the door, and therefore making best use of the modules which already exist.

To this end, the present invention relates to a method of commanding the heating of a motor vehicle rear-view mirror, said vehicle being, in particular, equipped with an electrical device for commanding the movement of the windows, said method being characterized in that it consists in using the device for lifting and lowering one and the same window to control the heating of the rear-view mirror.

By virtue of such arrangements, the command to de-ice the rear-view mirror is effected by the "window lifter" module, without increasing the number of modules that have to be fitted in each door. This allows this new de-icing function to be provided practically "for free".

The present invention also relates to a rear-view mirror heating device employing the abovementioned method.

Advantageously, it is an already existing central calculation unit which simultaneously commands the window drive motor in the lowering and the lifting directions. The invention thus consists in connecting the de-icing resistive element to an appropriate point of the window movement command circuit.

Further objectives, features and advantages of the present invention will in any case emerge from the description which follows by way of non-limiting example, and with reference to the appended FIG. 1.

BRIEF DESCRIPTION OF THE DRAWINGS

This FIG. 1 illustrates the set-up diagram for a device for commanding the heating of a rear-view mirror.

DESCRIPTION OF THE PREFERRED EMBODIMENT

Such a heating device 10 comprises a resistive heating element 11 placed in the rear-view mirror (not depicted) that is to be de-iced. This resistive heating element is connected to the electronic circuit 12 that commands the motor M for driving a window. A command circuit 12 such as this makes it possible, in the conventional way, to cause a window to be lifted or lowered according to the closure of a first 13 or of a second 14 component. In the most conventional case, this component is a relay but it may just as easily consist of a semiconductor device. The entire circuit 12 is powered by the battery +Bat. The operation of a so-called "window lifter" motor such as this is known, and will be only briefly recalled hereinbelow.

When the driver wishes to lift or lower a window, he gives a closure or opening order via a keypad 15 (in general, he simply presses a button 15a or 15b indicating the desired direction of travel of the window). This order is transmitted to a central calculation unit 16 (a microprocessor) which will then command a set of relays 17, 18 commanding closure of one of the two relays 13 or 14 to +Bat, the other relay being closed to ground. As soon as the relay 13 is closed to +Bat, and the relay 14 is closed to ground (for example) the motor M is powered and subjected to a potential difference (in a given direction) between these two terminals A and B. In doing this, the motor is driven in a given direction of rotation (dependent upon the direction of the potential difference at the motor terminals). The window is therefore driven, for example, upward.

If it is the second relay 14 which is closed to +Bat and the relay 13 which is closed to ground, the potential difference established at the terminals A and B of the motor is reversed. The direction of rotation of the motor M and of the movement of the window is then reversed (for example, downward).

Of course, where no window movement is desired, the two relays 13 or 14 are closed to ground.

The invention consists in using this window-command circuit 12 also to command the heating 10 of the mirror part of the rear-view mirror.

To this end, all that is required is for one end of the resistive element 11 for heating this mirror to be connected to the point C of the window command circuit 12. The other end of this resistive heating element is connected to ground.

When the driver wishes to operate the mirror de-icing device, he presses a button 15c. The de-icing order is transmitted to the central unit 16 which interprets this order as a simultaneous command to close the two relays 13 and 14 to +Bat.

By causing these two relays to close simultaneously to +Bat, the potential difference at the terminals of the window drive motor M is zero. Thus, the motor is not driven. The window is therefore not made to move. By contrast, the battery powers the mirror resistive heating element. The rear-view mirror is thus heated.

The invention makes it possible, by an astute use of the electric window-command circuit 12, to command the de-icing of the rear-view mirror. This heating of the rear-view mirror is performed practically for free, because it uses the microprocessor 16 and the command circuit 12 already installed in the vehicle.

Advantageously, the simultaneous closure to+Bat of the relays 13 and 14, which corresponds, as far as the command circuit 12 is concerned, to an order to simultaneously lift and lower one and the same window (a scenario which is impossible and therefore unused) is used to bring about the heating of the rear-view mirror. Advantageous use has thus been made of an unused command option for employing the window-command circuit to heat the rear-view mirror.

It will be noted that in the case when a command 15a or 15b to drive a window is given by the driver, this command is processed as a priority over the de-icing command 15c (which may very well be given by the driver at the same time). Priority is given to moving the window, because these movements are relatively swift. The driver will not notice that his de-ice order has been left waiting for the time taken for the window to effect the requested movement. Furthermore, the priority given to moving the window lengthens the time for which the de-icing device has to operate in order to fully de-ice the mirror only by a very small amount.

Of course, the present invention is not restricted to the embodiment described. Thus, the window-command circuit 12 could just as easily heat a number of rear-view mirrors, or even the rear window of the vehicle.

List of References Used

10 Rear-view mirror heating device,
11 Rear-view mirror resistive heating element,
12 Window movement command device,
13 First relay
14 Second relay
15 Keypad
15a Order to lift a window
15b Order to lower a window
15c De-ice order
16 Microprocessor (central calculation unit)
17 Command relay
18 Command relay
A,B Motor terminals
M Window drive motor

What is claimed is:

1. A method of heating a mirror of a motor vehicle, the motor vehicle having an electrical device for controlling a movement of at least one window of the motor vehicle and a device for heating the mirror connected to the electrical device, the method which comprises: actuating a device for lifting a given window and a device for lowering the given window simultaneously, and thereby bringing about a heating of the mirror.

2. The method according to claim 1, which comprises giving a command to lift a window or to lower a window priority over a command to heat the mirror.

3. A device for heating a mirror of a motor vehicle, comprising:

a first component connected to control a window drive motor of a motor vehicle in a lifting direction and a second component connected to control the window drive motor in the lowering direction;

a resistive heating element disposed in a mirror of the motor vehicle; and whereby said first and second components and said resistive heating element are connected such that a simultaneous actuation of said first and second components causes a current to pass through said resistive heating element, while said window drive motor is not driven.

4. The device according to claim 3, which further comprises a central calculation unit connected to and controlling said first and second components, said central calculation unit interpreting an order given by a driver of the motor vehicle to heat the mirror as a simultaneous command of the two components.

5. The device according to claim 3, wherein said first and second components are relays.

6. The device according to claims 3, wherein said first and second components are semiconductor devices.

* * * * *